(12) United States Patent
Takahashi

(10) Patent No.: US 10,779,130 B2
(45) Date of Patent: Sep. 15, 2020

(54) COMMUNICATION APPARATUS AND COMMUNICATION METHOD

(71) Applicant: SONY CORPORATION, Tokyo (JP)

(72) Inventor: Satoshi Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/476,190

(22) PCT Filed: Dec. 6, 2017

(86) PCT No.: PCT/JP2017/043821
§ 371 (c)(1),
(2) Date: Jul. 5, 2019

(87) PCT Pub. No.: WO2018/135166
PCT Pub. Date: Jul. 26, 2018

(65) Prior Publication Data
US 2019/0357016 A1 Nov. 21, 2019

(30) Foreign Application Priority Data
Jan. 23, 2017 (JP) .................. 2017-009523

(51) Int. Cl.
*H04W 76/15* (2018.01)
*H04W 4/80* (2018.01)
(Continued)

(52) U.S. Cl.
CPC ............ *H04W 4/08* (2013.01); *H04W 4/80* (2018.02); *H04W 84/20* (2013.01)

(58) Field of Classification Search
CPC ......... H04W 4/08; H04W 4/80; H04W 84/20; H04W 84/18; H04W 76/10; H04W 76/15; H04B 3/544; H04B 7/18558; H04M 1/00
See application file for complete search history.

(56) References Cited

U.S. PATENT DOCUMENTS 7,164,887 B2   1/2007 Tanda et al.
2002/0122405 A1   9/2002 Liang
(Continued)

FOREIGN PATENT DOCUMENTS

CN   1430341 A   7/2003
CN   101617518 A   12/2009
(Continued)

OTHER PUBLICATIONS

Extended European Search Report for EP Patent Application No. 17892801.6, dated Oct. 4, 2019, 14 pages.
(Continued)

*Primary Examiner* — Andrew Wendell
(74) *Attorney, Agent, or Firm* — Chip Law Group

(57) ABSTRACT

A desirable connection form in consideration of a radio wave state is caused to be formed among three or more communication apparatuses. Group list information indicating three or more communication apparatuses, including local equipment, that have been set as a group for performing wireless communication is referred to so as to grasp communication apparatuses that have been set as the group. Then, a value indicating a degree of stability of communication between respective communication apparatuses indicated in the group list information is obtained, and a new connection form to which a change is desirably performed is determined by using the value indicating the degree of stability of communication between the respective communication apparatuses. Then, processing is performed for changing a connection state of respective communication apparatuses included in the group to the new connection form.

10 Claims, 10 Drawing Sheets

(51) Int. Cl.
*H04W 4/08* (2009.01)
*H04W 84/20* (2009.01)

(56) References Cited

U.S. PATENT DOCUMENTS

| | | | |
|---|---|---|---|
| 2003/0124979 | A1 | 7/2003 | Tanda et al. |
| 2008/0274770 | A1* | 11/2008 | Park .................... H04M 1/6016 455/557 |
| 2009/0319613 | A1 | 12/2009 | Hjelm et al. |
| 2013/0128875 | A1* | 5/2013 | Kubota ................ H04W 36/08 370/338 |
| 2013/0142056 | A1* | 6/2013 | Abplanalp ............... H04W 4/08 370/252 |
| 2013/0279411 | A1* | 10/2013 | Gassend ............... H04W 36/30 370/328 |
| 2014/0018002 | A1* | 1/2014 | Jose ........................ H04W 4/80 455/41.2 |
| 2014/0328296 | A1* | 11/2014 | Chen ..................... H04L 67/104 370/329 |
| 2014/0335823 | A1* | 11/2014 | Heredia ................ H04W 4/029 455/411 |
| 2015/0195857 | A1* | 7/2015 | Pan ....................... H04W 76/10 455/41.3 |
| 2016/0028802 | A1* | 1/2016 | Balasingh ........... H04L 67/1051 709/224 |

FOREIGN PATENT DOCUMENTS

| | | | |
|---|---|---|---|
| EP | 1324540 | A2 | 7/2003 |
| JP | 2006-157666 | * | 6/2006 ............ H04L 12/28 |
| JP | 2006-157666 | A | 6/2006 |
| JP | 4378888 | B2 | 12/2009 |
| JP | 2010-519807 | A | 6/2010 |
| WO | 2008/103103 | A2 | 8/2008 |

OTHER PUBLICATIONS

Office Action for JP Patent Application No. 2018563203, dated May 20, 2019, 01 page of Office Action.

International Search Report and Written Opinion of PCT Application No. PCT/JP2017/043821, dated Feb. 27, 2018, 06 pages of ISRWO.

* cited by examiner

RRA

| | GROUP LIST |
|---|---|
| 1ST ROW | BD_ADDR OF COMMUNICATION APPARATUS 1A |
| 2ND ROW | BD_ADDR OF COMMUNICATION APPARATUS 1B |
| 3RD ROW | BD_ADDR OF COMMUNICATION APPARATUS 1C |

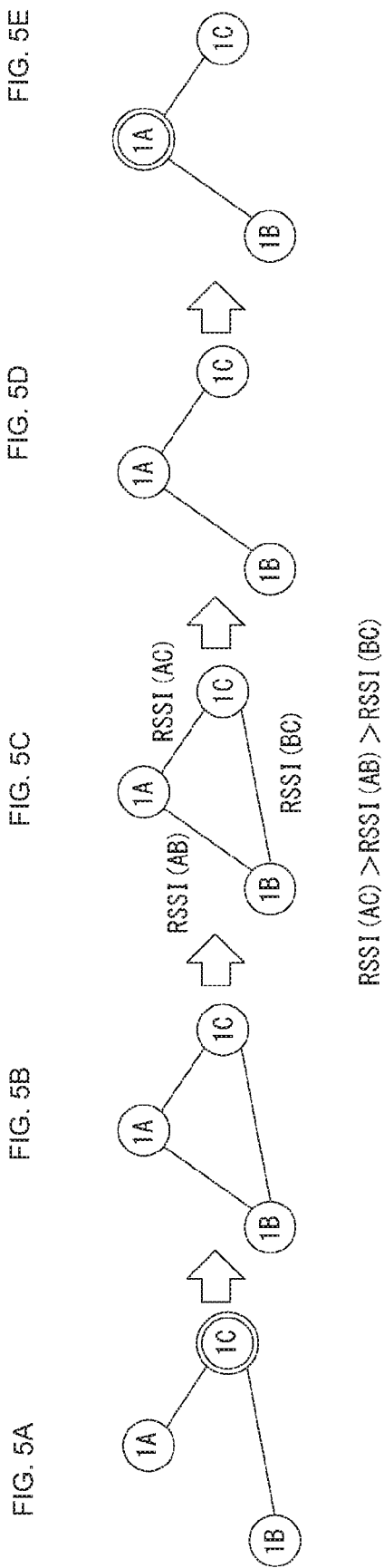

COMMUNICATION APPARATUS AND COMMUNICATION METHOD

CROSS REFERENCE TO RELATED APPLICATIONS

This application is a U.S. National Phase of International Patent Application No. PCT/JP2017/043821 filed on Dec. 6, 2017, which claims priority benefit of Japanese Patent Application No. JP 2017-009523 filed in the Japan Patent Office on Jan. 23, 2017. Each of the above-referenced applications is hereby incorporated herein by reference in its entirety.

TECHNICAL FIELD

The present technology relates to a communication apparatus, a communication method, and a program, and in particular, to processing for a connection form in communication among three or more multiple pieces of equipment.

BACKGROUND ART

A Bluetooth (registered trademark) wireless technology is peer to peer (P2P) communications, and enables communication between pieces of equipment which have been paired in advance.

Furthermore, Bluetooth communication is performed in units of a piconet. A piconet can be configured by one piece of master equipment and seven pieces of slave equipment at maximum simultaneously.

Patent Document 1 listed below describes that a state of communication between a master and a slave is periodically monitored and the master and the slave are changed as needed.

CITATION LIST

Patent Document

Patent Document 1: Japanese Patent No. 4378888

SUMMARY OF THE INVENTION

Problems to be Solved by the Invention

Meanwhile, communication apparatuses that enable calls in a group of a plurality of persons who are located at a short distance are useful. If Bluetooth communication apparatuses attached to helmets to be used for motorcycles, skiing, or the like are used, for example, calls can be enabled among companions located close to each other.

In this case, it is sufficient that a plurality of companions, such as three or four companions, for example, pair their own communication apparatus with respective communication apparatuses of the other companions so as to form a group.

In communication among three or more pieces of equipment, as described above, in a situation where respective pieces of equipment (users of the respective pieces of equipment) can freely move, an apparent communicable distance is determined depending on a connection form of the respective pieces of equipment. Therefore, users are required to use, for example, microphone headsets for motorcycles that use a Bluetooth communication scheme, in consideration of a connection form.

For example, a case is assumed where there are equipment A, equipment B, and equipment C, equipment B is a master, and a connection form is equipment A-equipment B-equipment C. In this case, a user located at the head uses equipment A, a user located in the next position uses equipment B, and a user located at the end uses equipment C. This enables the users to use these pieces of equipment at a maximum communicable distance.

However, in a case where a user of equipment B and a user of equipment A are replaced with each other and alignment is changed to equipment B-equipment A-equipment C, a communication distance from the head to the end becomes a communication distance between equipment B and equipment C, and the communication distance is halved.

Therefore, in order to maintain a maximum communication distance, it is required that the users line up while being conscious of a connection form to use the pieces of equipment. Alternatively, in a case where the users change in alignment, it is required that connection be temporarily disconnected and reestablished according to the alignment of the users. However, in both cases, the users are required to have knowledge in wireless and perform a complicated operation, and usability is significantly reduced.

Note that Patent Document 1 describes that a master and a slave are replaced with each other in accordance with a communication state, but does not disclose a practical method for detecting a communication state between slaves. Therefore, there remains a problem in which the master and the slave fail to be smoothly replaced with each other.

Accordingly, it is an object of the present technology to enable a desirable connection form among, for example, three or more pieces of equipment to be smoothly and easily obtained regardless of a positional relationship among users.

Solutions to Problems

A communication apparatus according to the present technology includes: a connection form determination unit that refers to group list information indicating three or more communication apparatuses that have been set as a group for performing wireless communication, the three or more communication apparatuses including local equipment, obtains a value indicating a degree of stability of communication between respective communication apparatuses indicated in the group list information, and determines a new connection form by using the value indicating the degree of stability of communication between the respective communication apparatuses; and a connection form change processing unit that performs processing for causing the new connection form determined by the connection form determination unit to be formed among respective communication apparatuses included in the group.

Assume, for example, that, in a situation where three communication apparatuses are grouped and in communication, one of the three communication apparatuses is set as master equipment and two of the three communication apparatuses are set as pieces of slave equipment to form a piconet. In this case, there is no guarantee that this connection form will always be maintained optimal. Accordingly, the connection form determination unit determines, for example, whether or not a current connection form is optimal in a present situation. If the current connection form is not optimal, the connection form determination unit determines a new more suitable connection form. The connection form change processing unit performs processing for changing the current connection form to a connection form that has been determined to be more suitable. For example, processing is performed for changing the master equipment to other master equipment.

In the above-described communication apparatus according to the present technology, it is conceivable that the connection form determination unit starts processing for determining a connection form on the basis of a user's operation.

In response to the user's operation, the connection form determination unit determines a desirable connection state, and the connection form change processing unit performs processing for changing a connection form.

In the above-described communication apparatus according to the present technology, it is conceivable that the connection form determination unit obtains a value of a received signal strength indicator between respective communication apparatuses indicated in the group list information, as the value indicating the degree of stability of communication between the respective communication apparatuses.

In other words, a value of a received signal strength indicator between respective communication apparatuses is confirmed for round-robin combinations of the three or more respective communication apparatuses.

In the above-described communication apparatus according to the present technology, it is conceivable that the connection form determination unit requests information relating to the received signal strength indicator from a communication apparatus selected according to the group list information, and receives, from a communication apparatus serving as a request destination, the information relating to the received signal strength indicator between the communication apparatus serving as the request destination and another communication apparatus.

In other words, a value of a received signal strength indicator between another communication apparatus in the group and each of the communication apparatuses is requested from the other communication apparatus.

In the above-described communication apparatus according to the present technology, it is conceivable that in a case where a communication apparatus that has not yet been connected is selected in accordance with the group list information, the connection form determination unit performs processing for connection of communication with the selected communication apparatus.

In other words, connection is established when the value of the received signal strength indicator is requested from another communication apparatus that has not yet been connected in the group.

In the above-described communication apparatus according to the present technology, it is conceivable that the connection form determination unit determines communication apparatuses having a lowest degree of stability of communication therebetween, from among communication apparatuses that have been set as the group, and that the connection form change processing unit performs processing for disconnecting communication between the communication apparatuses having the lowest degree of stability of communication.

In order to realize a desirable connection form, from among combinations of respective communication apparatuses in the group, communication apparatuses having the lowest degree of stability of communication therebetween are disconnected.

In the above-described communication apparatus according to the present technology, it is conceivable that the connection form change processing unit performs processing for setting master equipment and slave equipment in such a way that communication is available among the respective communication apparatuses that have been set as the group in a state where the communication between the communication apparatuses having the lowest degree of stability of communication therebetween has been disconnected.

In other words, a relationship between master equipment and slave equipment is optimized in such a way that respective pieces of equipment can perform communication in a state where certain communication apparatuses having a low quality of communication have been disconnected.

It is conceivable that the above-described communication apparatus according to the present technology further includes a sound input unit, a sound output unit, and a codec unit that encodes and decodes a sound signal, and call sound is communicated.

In other words, the above-described communication apparatus according to the present technology is a communication apparatus to be used in calls of conversation sound or the like.

A communication method according to the present technology is a communication method of a communication apparatus, the communication method including: a connection form determination procedure for referring to group list information indicating three or more communication apparatuses that have been set as a group for performing wireless communication, the three or more communication apparatuses including local equipment, obtaining a value indicating a degree of stability of communication between respective communication apparatuses indicated in the group list information, and determining a new connection form by using the value indicating the degree of stability of communication between the respective communication apparatuses; and a connection form change processing procedure for performing processing for causing the new connection form determined in the connection form determination procedure to be formed among respective communication apparatuses included in the group.

A program according to the present technology is a program for causing an arithmetic processor that controls a communication apparatus to execute a process including steps that correspond to the connection form determination procedure and the connection form change processing procedure that have been described above.

Effects of the Invention

The present technology provides an effect in which a current connection form is easily and smoothly changed into a new connection form that causes a communication state to be more improved. In particular, by using a group list, the determination of a new connection form and a change into the new connection form are smoothly realized. This enables a user's usability to be significantly improved.

Note that the effect described here is not necessarily restrictive, and any of effects described in the present disclosure may be exhibited.

BRIEF DESCRIPTION OF DRAWINGS

FIGS. 5A, 5B, 5C, 5D, and 5E are explanatory diagrams of connection form optimization according to the embodiment.

MODE FOR CARRYING OUT THE INVENTION

An embodiment is described below in the following order.
<1. Configuration of communication apparatus>
<2. Grouping and group list>
<3. Connection form optimization operation>
<4. Example of processing of communication apparatus>
<5. Summary and modified examples>
<1. Configuration of Communication Apparatus>

In the embodiment, a communication apparatus 1 serving as Bluetooth communication equipment is used as an example. This communication apparatus 1 is assumed to be equipment that enables sound communication (calls) with another communication apparatus 1 that has been paired in a state where a user wears or possesses the communication apparatus 1.

Figure 1A:
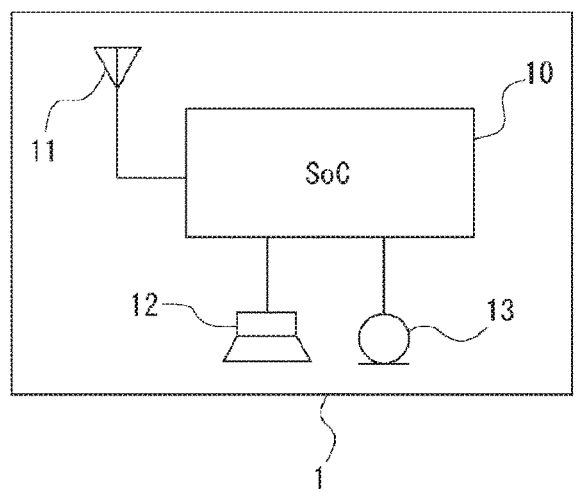
FIGS. 1A and 1B are block diagrams of a communication apparatus according to an embodiment of the present technology.

FIG. 1A illustrates a configuration of a communication apparatus 1 according to the embodiment.

The communication apparatus 1 includes a system-on-a-chip (SoC) 10, an antenna 11, a speaker 12, and a microphone 13.

The SoC 10 is a Bluetooth SoC that has been generated as a device that performs Bluetooth communication control.

Figure 1B:
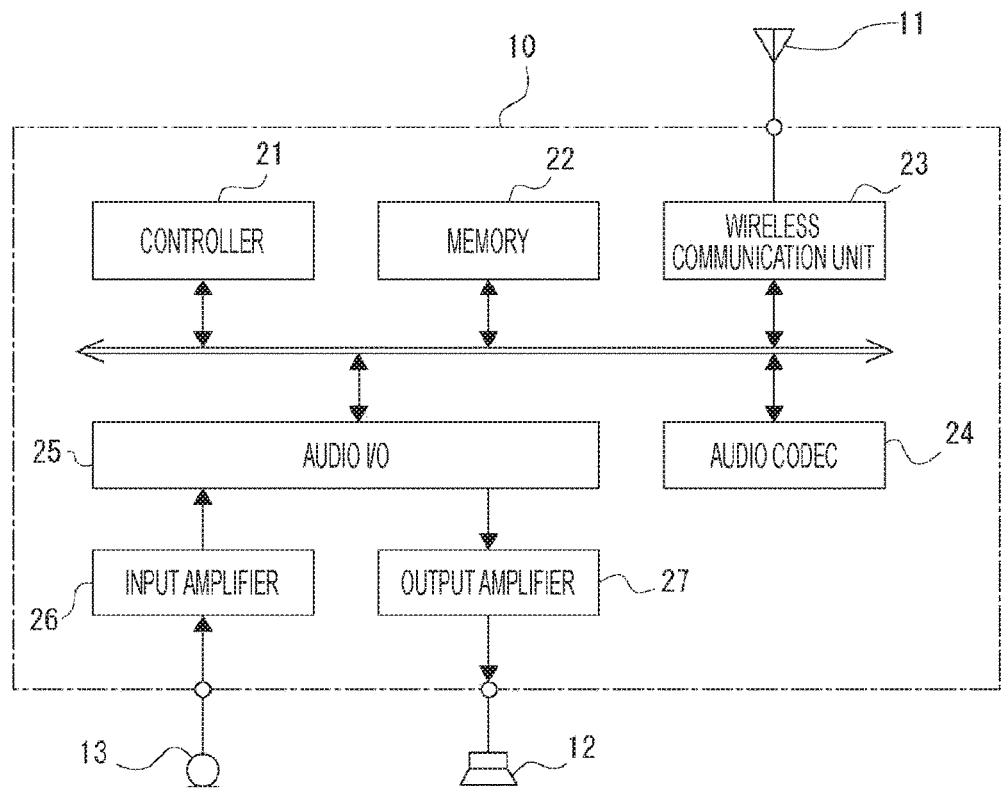

FIG. 1B illustrates an internal configuration example of the SoC 10. Note that, although an example using an SoC is illustrated here, an SoC form is not restrictive. It is sufficient that the communication apparatus 1 has a configuration for performing Bluetooth communication control, as illustrated in FIG. 1B.

The communication apparatus 1 includes a controller 21, a memory 22, a wireless communication unit 23, an audio codec 24, an audio interface 25, an input amplifier 26, and an output amplifier 27.

The controller 21 is configured by a micro control unit (MCU), a digital signal processor (DSP), or the like, and controls an entire operation of the communication apparatus 1.

Figure 2:
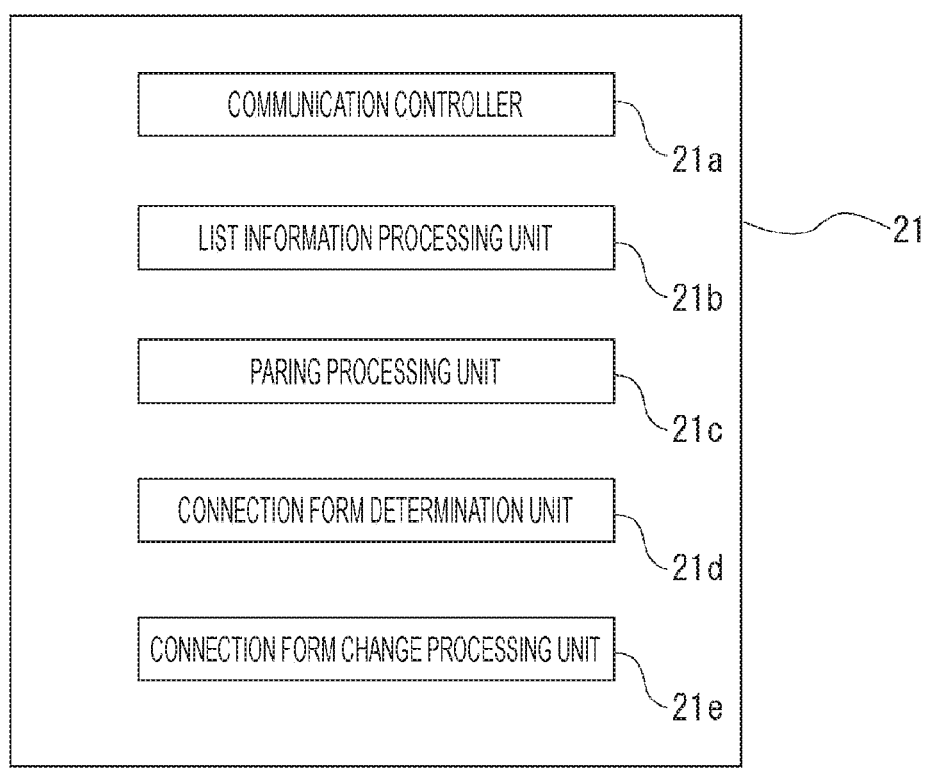
FIG. 2 is an explanatory diagram of a functional configuration of a controller of the communication apparatus according to the embodiment.

In the case of the present embodiment, the controller 21 is assumed to have respective functions of a communication controller 21a, a list information processing unit 21b, a pairing processing unit 21c, a connection form determination unit 21d, and a connection form change processing unit 21e that are illustrated in FIG. 2 in accordance with an operation program.

The communication controller 21a is illustrated as a function of controlling an entire operation of sound communication with another communication apparatus 1 via the wireless communication unit 23.

The list information processing unit 21b is a function of generating or obtaining a group list indicating equipment that is capable of wireless communication and that has been selected as equipment that can fall under a group for performing communication. The group list is used to efficiently perform a grouping operation to perform pairing among three or more communication apparatuses 1. This group list is information obtained by listing local equipment and pieces of equipment that have been selected as connection target equipment for group calls, from among pieces of equipment capable of communication that exist near the local equipment.

In performing grouping in which three or more communication apparatuses 1 are paired with each other and a sound communicable group is formed, in a case where a certain communication apparatus 1 serves as master equipment, the certain communication apparatus 1 performs processing for generating the group list by using a function of the list information processing unit 21b.

Furthermore, in the case of a communication apparatus 1 serving as slave equipment, the communication apparatus 1 performs processing for receiving and obtaining a group list transmitted by another communication apparatus 1, by using the function of the list information processing unit 21b.

The pairing processing unit 21c performs normal one-to-one equipment pairing processing. Furthermore, the pairing processing unit 21c also performs processing for performing pairing between respective communication apparatuses 1 in order to enable three or more communication apparatuses 1 to perform group calls. In this case, a group list is referred to, and processing is performed for pairing between local equipment and respective communication apparatuses 1 indicated in the group list. In other words, the pairing processing unit 21c performs processing for pairing with a plurality of other communication apparatuses 1 in such a way that respective communication apparatuses 1 listed in the group list are paired in all of the combinations.

The connection form determination unit 21d refers to the group list, and performs processing for obtaining a value indicating a degree of stability of communication with each of the communication apparatuses 1 indicated in the group list, and processing for determining a new desirable connection form by using the value indicating the degree of stability of communication with each of the communication apparatuses 1.

The value indicating the degree of stability of communication is, for example, a value of a received signal strength indicator (RSSI).

The connection form change processing unit 21e is a function of performing processing that causes a new connection form determined by the connection form determination unit 21d to be formed between respective communication apparatuses 1 included in a group. For example, a new connection form that realizes more stable communication than current communication is caused to be formed. For this purpose, for example, processing, such as control to disconnect between prescribed communication apparatuses 1 or setting of a master and a slave, is performed.

The connection form determination unit 21d and the connection form change processing unit 21e are functions of performing connection form optimization described later.

The memory 22 of FIG. 1B comprehensively indicates a read only memory (ROM), a random access memory (RAM), a flash ROM, and the like.

In the ROM and the flash ROM in the memory 22, a program for realizing the respective functions illustrated in FIG. 2, a constant required for various types of processing, and the like are stored.

The RAM in the memory 22 is used as an arithmetic area of various types of processing such as communication control, pairing processing, the generation of the group list, or connection form optimization processing, or is used for temporary data storage.

Information relating to pairing equipment or the group list is stored in the RAM or the flash ROM.

The wireless communication unit 23 is illustrated as a unit that performs sound data communication according to a Bluetooth communication scheme via the antenna 11 under the control of the controller 21.

The audio codec 24 performs encoding and decoding for sound data communication. In other words, sound data of transmitted sound that has been obtained using the microphone 13 is encoded, and is supplied to the wireless communication unit 23. Furthermore, sound data received by the wireless communication unit 23 is decoded.

Transmitted sound of a user is collected by the microphone 13. An analog sound signal collected by the microphone 13 is supplied to the input amplifier 26. In the input amplifier 26, automatic gain control (AGC) processing, limiter processing, filter processing, processing for conversion to a digital signal, (A/D conversion), equalizing, or the like is performed, and digital data of the transmitted sound is supplied to the audio interface 25, and is transferred to the audio codec 24. Then, encoding processing is performed, and data is transmitted from the wireless communication unit 23.

Sound data of received sound that has been received by the wireless communication unit 23 and has been decoded by the audio codec 24 is supplied to the output amplifier 27 via the audio interface 25. In the output amplifier 27, a sound signal on which equalizing, processing for conversion to an analog signal (D/A conversion), level adjustment, amplification using a power amplifier, or the like has been performed is supplied to the speaker 12, and sound is caused to be output from the speaker 12.

Figure 3A:
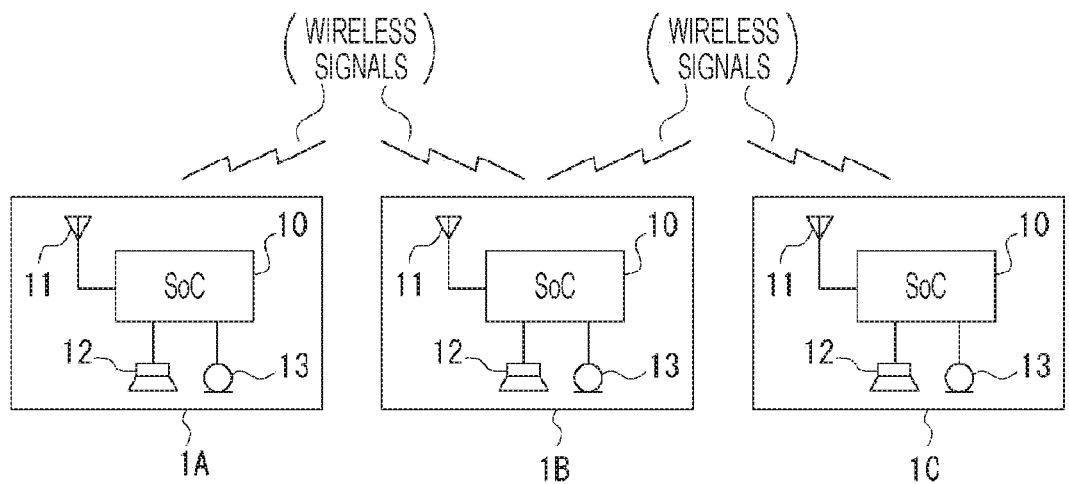
FIGS. 3A and 3B are explanatory diagrams of communication among communication apparatuses according to the embodiment.

As a communication apparatus 1 having the configuration described above, three communication apparatuses 1A, 1B, and 1C are illustrated in FIG. 3A.

These communication apparatuses 1A, 1B, and 1C are connected according to the Bluetooth wireless scheme, and this enables mutual conversation via sound within a wirelessly reachable range even in a case where users are located far from each other, and this further enables all of the users to make conversation.

Figure 3B:
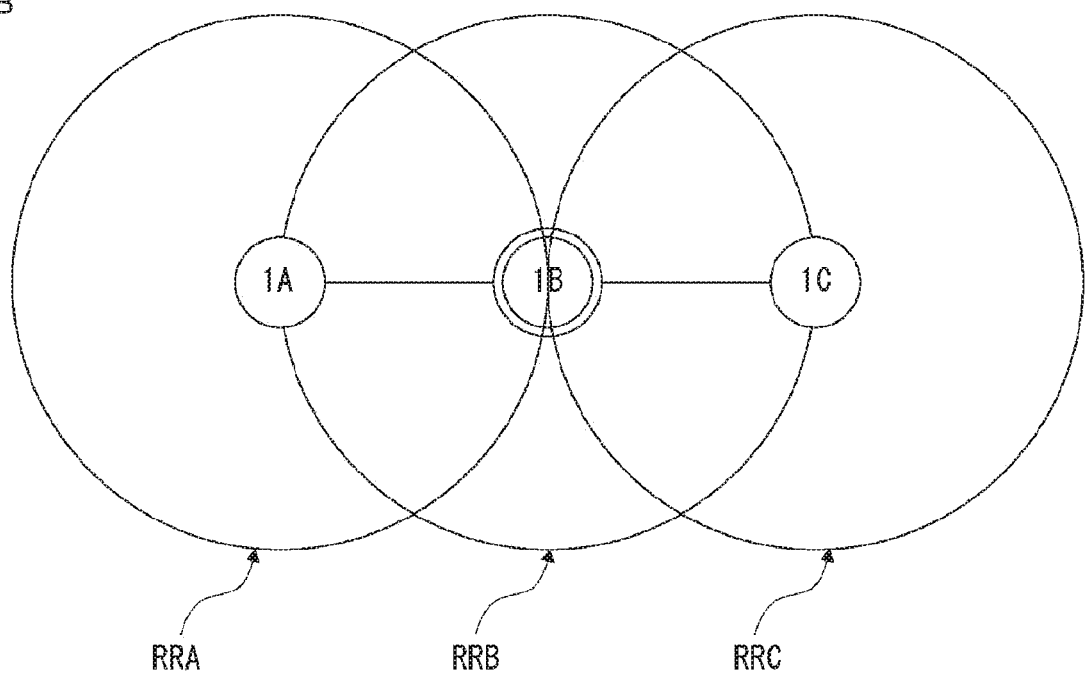

FIG. 3B illustrates a state where the communication apparatuses 1A, 1B, and 1C have the longest communicable distance. Note that a state is illustrated where the communication apparatus 1B illustrated as a double circle serves as master equipment, the communication apparatuses 1A and 1C illustrated as a single circle serve as pieces of slave equipment, and a piconet is formed.

Areas RRA, RRB, and RRC are respectively ranges that radio waves reach from the communication apparatuses 1A, 1B, and 1C. The pieces of slave equipment are aligned on a straight line in the area RRB with the communication apparatus 1B serving as master equipment as a center, and therefore a communicable distance between the communication apparatuses 1A and 1C becomes maximum.

However, a positional relationship among respective users who possess the communication apparatuses 1A, 1B, and 1C changes, and therefore a maximum communicable distance, as described above, is not always obtained.

<2. Grouping and Group List>

Here, grouping for performing group calls among the three communication apparatuses 1A, 1B, and 1C is described.

In order to perform sound communication using a Bluetooth wireless technology, the communication apparatuses 1A, 1B, and 1C need to be paired with each other in advance.

For example, in order to enable the communication apparatuses 1A, 1B, and 1C to be easily paired with each other, as described above, it is conceivable that a group list is generated and pairing is automatically performed using the group list.

Figures 4A, 4B:
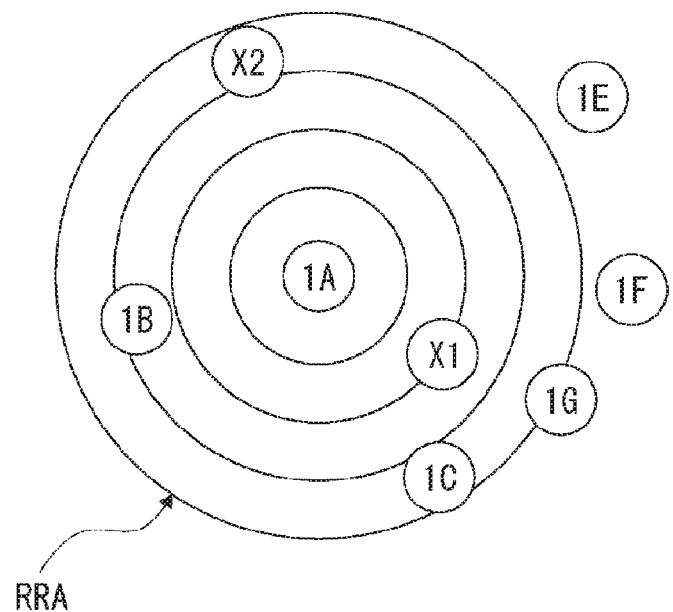
FIGS. 4A and 4B are explanatory diagrams of generation of a group list according to the embodiment.

FIG. 4A illustrates pieces of equipment capable of Bluetooth communication that exist in the vicinity with the communication apparatus 1A as a center. Note that a circular range RRA is assumed to be a range that an ID packet transmitted from the communication apparatus 1A reaches.

Here, it is assumed that communication apparatuses 1E, 1F, and 1G are similar communication apparatuses 1, but exist in relatively remote positions.

It is assumed that each of equipment X1 and equipment X2 is also equipment capable of Bluetooth communication but is not equipment for sound calls with a communication apparatus 1. For example, each of the equipment X1 and the equipment X2 is assumed to be equipment such as a music player or game equipment. The equipment X1 and the equipment X2 exist in positions where they can communicate with the communication apparatus 1A.

Here, a situation is assumed where three persons who possess the communication apparatuses 1A, 1B, and 1C desire to perform wireless calls in a group.

It is assumed that the respective communication apparatuses 1E, 1F, and 1G are communication apparatus 1 that are possessed by other persons who have no relationship with each other.

In a case where grouping is now performed with the communication apparatus 1A as a master, equipment capable of Bluetooth communication is searched for, so that the communication apparatuses 1A, 1B, and 1C and the pieces of equipment X1 and X2 are detected.

The communication apparatus 1A selects pieces of equipment to be grouped, from among the detected pieces of equipment capable of communication.

In this case, the equipment X1 and the equipment X2 can be excluded from connection target equipment by confirming equipment type information of each of the detected pieces of equipment.

Furthermore, even in a case where the communication apparatus 1G has been detected, the communication apparatus 1G has an excessively low received signal strength indicator. In response to this, the communication apparatus 1G can be excluded from the connection target equipment by reducing the selection priority of the communication apparatus 1G. Furthermore, by setting the number of pieces of equipment to be included in a group to 3, the communication apparatus 1G can also be excluded from the connection target equipment due to the limit of the number of pieces of equipment.

As described above, the communication apparatus 1A selects pieces of equipment in a group, and generates a group list obtained by listing respective pieces of equipment that will belong to the group.

An example of the group list is illustrated in FIG. 4B.

Local equipment (the communication apparatus 1A) is described in a first row.

The communication apparatus 1B and the communication apparatus 1C that have been selected as equipment in the group are described in a second row and a row that follows. The respective communication apparatuses 1A, 1B, and 1C are indicated by using a Bluetooth device address (BD_ADDR).

As described above, the group list is generated as a list that indicates all pieces of equipment in a group at the time of grouping.

By using this group list, the respective pieces of equipment in the group can be paired with each other automatically and efficiently.

For example, the communication apparatus 1A performs pairing with the communication apparatus 1B in accordance with the group list, and transmits the group list to the communication apparatus 1B. The communication apparatus 1A performs pairing with the communication apparatus 1C in accordance with the group list, and transmits the group list to the communication apparatus 1C.

By doing this, pairing can be performed between the communication apparatuses 1A and 1B and between the communication apparatuses 1A and 1C. Next, the communication apparatus 1A issues, to the communication apparatus 1B, an instruction to perform pairing according to the group list. The communication apparatus 1B searches for equipment that has not yet been paired in the group list, and performs pairing with the communication apparatus 1C that falls under the equipment that has not yet been paired. By doing this, all of the pieces of equipment have been paired with each other in a round-robin manner.

Furthermore, the respective communication apparatuses 1A, 1B, and 1C enter into a state of possessing the group list.

<3. Connection Form Optimization Operation>

Even after grouping is performed such that calls become available, satisfactory calls are not always available. This is because call quality changes depending on a positional relationship among respective users and a call available distance also changes. That is, a connection form of the communication apparatuses 1A, 1B, and 1C that has been set once is not always an optimal connection form. Accordingly, in the present embodiment, connection form change processing is performed for causing a desirable connection form to be formed according to a situation.

An overview is described with reference to FIGS. 5A, 5B, 5C, 5D, and 5E. It is assumed that the communication apparatuses 1A, 1B, and 1C are paired with each other so as to form a single group and each of the communication apparatuses 1A, 1B, and 1C possesses a group list as illustrated in FIG. 4B.

In FIG. 5A, it is assumed that the three communication apparatuses 1A, 1B, and 1C have been connected to each other so as to form a piconet, the communication apparatus 1C serves as master equipment, and the communication apparatuses 1A and 1B serve as pieces of slave equipment. A state is illustrated where the communication apparatuses 1A and 1C have been connected and the communication apparatuses 1B and 10 have been connected.

However, in a case where it is assumed that the communication apparatuses 1A, 1B, and 1C move in a direction away from each other, this positional relationship indicates a state where a more desirable connection form is conceivable. In some cases, the communication apparatuses 1B and 1C are too far away from each other, and noise increases in a call between the communication apparatus 1A or 1C and the communication apparatus 1B or the call is likely to be interrupted.

For example, in such a case, connection form optimization is assumed to be performed. First, RSSI values between respective communication apparatuses 1 are collected.

The communication apparatuses 1A and 1B serving as slaves are not connected, and therefore the communication apparatuses 1A and 1B are first connected in order to obtain an RSSI value (FIG. 5B). Note that connection has already been established between the communication apparatuses 1A and 1C and between the communication apparatuses 1B and 1C, and therefore RSSI values can be detected.

Next, an RSSI value between respective communication apparatuses 1 is obtained (FIG. 5C). That is, each of an RSSI (AB) value serving as a received signal strength indicator between the communication apparatuses 1A and 1B, an RSSI (AC) value serving as a received signal strength indicator between the communication apparatuses 1A and 1C, and an RSSI (BC) value serving as a received signal strength indicator between the communication apparatuses 1B and 1C is obtained.

Here, it is assumed that RSSI (AC)>RSSI (AB)>RSSI (BC) is established. That is, the RSSI (BC) value between the communication apparatuses 1B and 1C is the smallest.

Connection having a small RSSI value is connection in which call quality or a call available distance has a small margin. Accordingly, connection having a smallest RSSI value, namely, connection between the communication apparatuses 1B and 1C, is disconnected (FIG. 5D).

Then, roles are adjusted among the respective communication apparatuses 1, and a piconet is formed (FIG. 5E). In this case, a new connection form is formed in which the communication apparatus 1A serves as master equipment and the communication apparatuses 1B and 1C serve as pieces of slave equipment.

Note that, in order to realize the connection form optimization operation described above, the respective communication apparatuses 1A, 1B, and 1C need to have been paired with all of the communication apparatuses that form a network and to have been grouped. Therefore, the respective communication apparatuses 1A, 1B, and 1C are assumed to internally store the group list illustrated in FIG. 4B.

Figure 6:
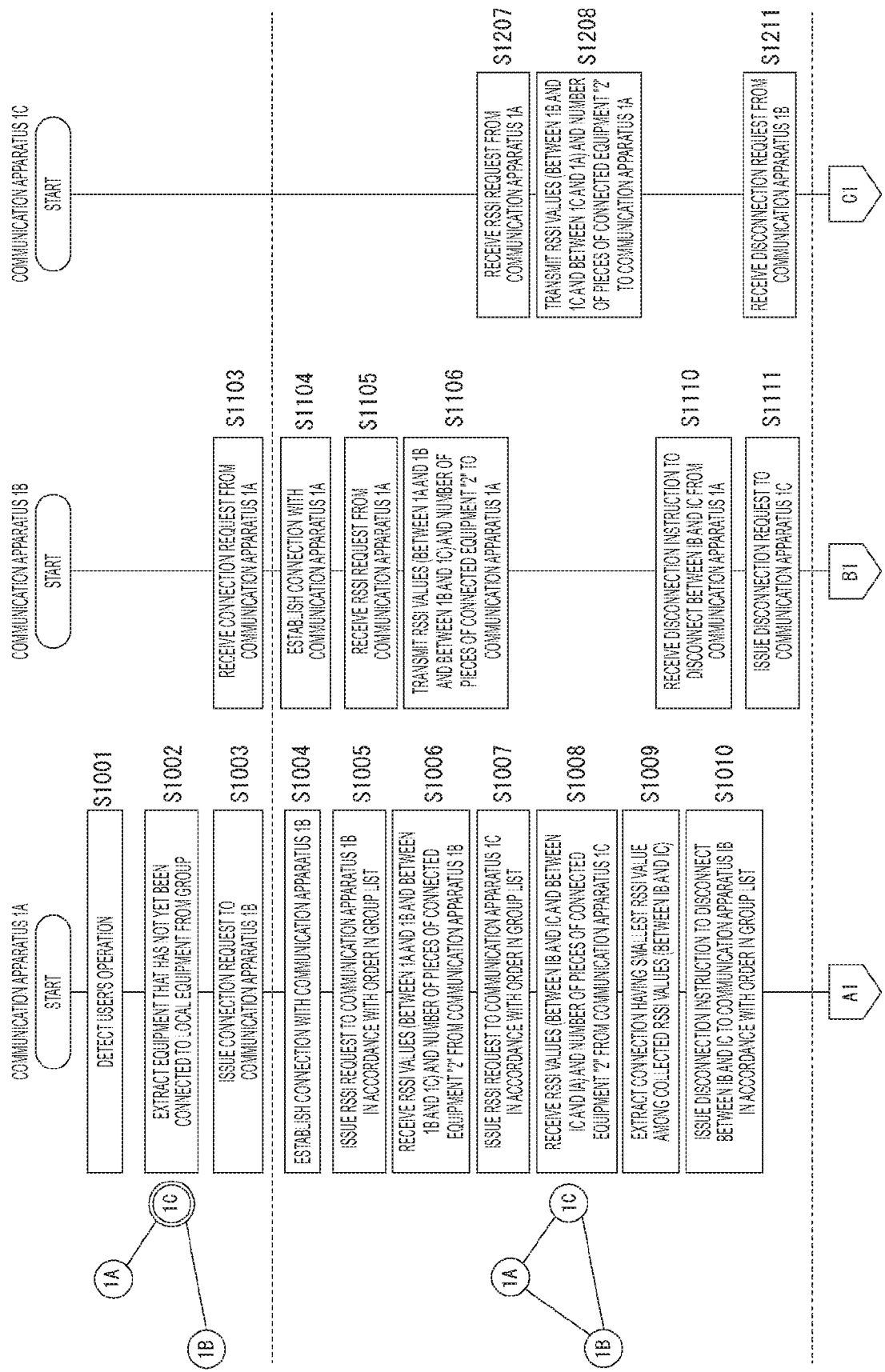
FIG. 6 is a flowchart of a connection form optimization operation according to the embodiment.
Figure 7:
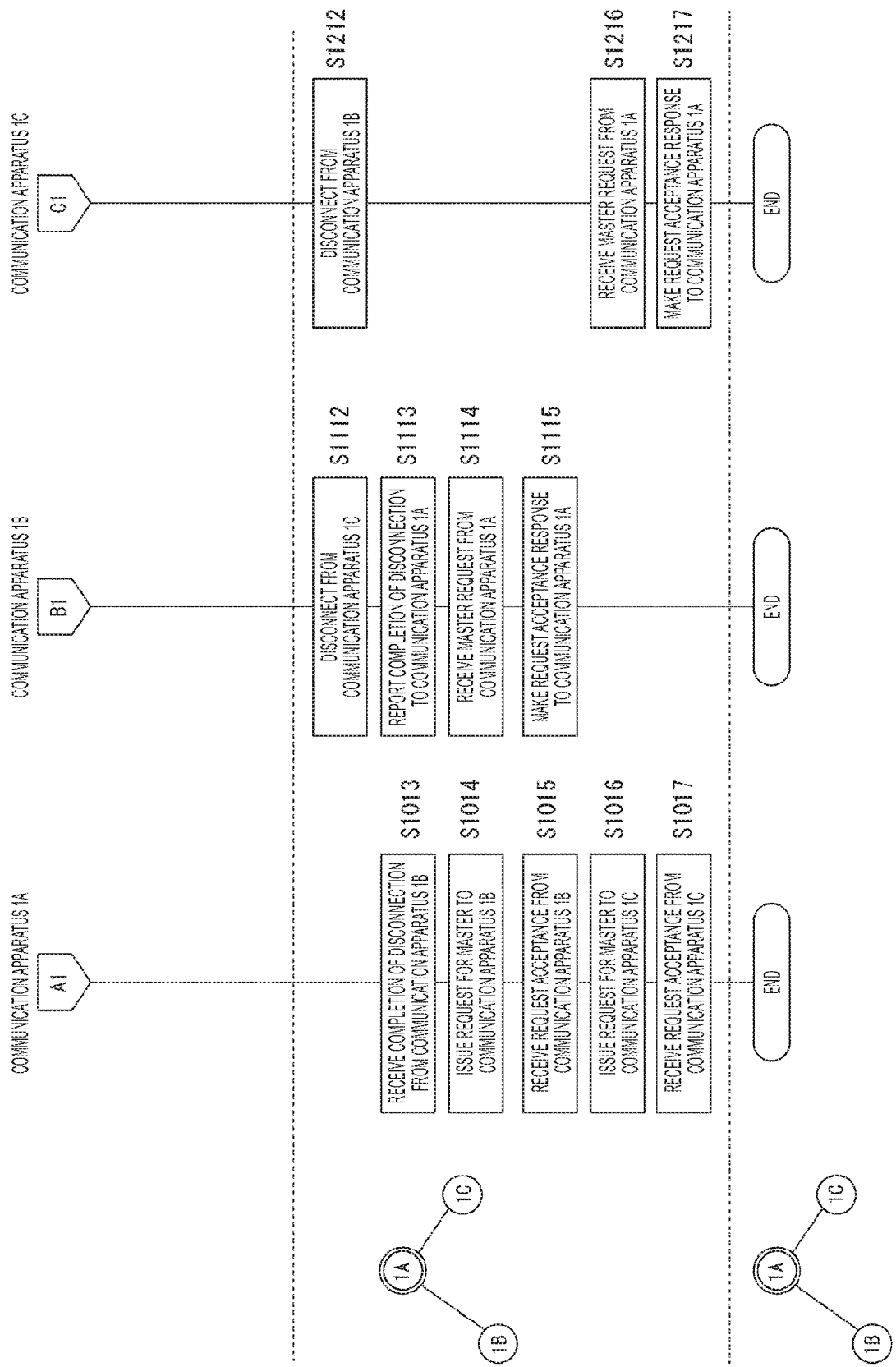
FIG. 7 is a flowchart of the connection form optimization operation according to the embodiment.

A specific example of the connection form optimization operation is described in FIGS. 6 and 7. In the respective drawings, it is assumed that there are the communication apparatuses 1A, 1B, and 1C of FIGS. 5A, 5B, 5C, 5D, and 5E, and the respective drawings illustrate a flow of control processing of the controller 21 in each of the communication apparatuses 1 (1A, 1B, and 1C). A positional relationship among the communication apparatuses 1A, 1B, and 1C corresponds to FIGS. 5A, 5B, 5C, 5D, and 5E.

FIGS. 6 and 7 described above are flowcharts using, as an example, a case where a user of the communication apparatus 1A serving as slave equipment has performed an operation to start connection form optimization.

Note that "A1", "B1", and "C1" in FIG. 6 respectively indicate that the processing moves on to the same reference signs in FIG. 7.

First, the user of the communication apparatus 1A performs an operation of connection form optimization in the communication apparatus 1A. The communication apparatus 1A detects the user's operation in step S1001.

In step S1002, the communication apparatus 1A performs processing for extracting a communication apparatus 1 that has not yet been connected to the local equipment from the group list. In the group list, the communication apparatus 1A, the communication apparatus 1B, and the communication apparatus 1C are described in this order, and the communication apparatus 1A has already been connected to the communication apparatus 1C, but has not yet been connected to the communication apparatus 1B.

Next, in step S1003, the communication apparatus 1A transmits a connection request to the communication apparatus 1B, and makes an attempt to establish connection with the communication apparatus 1B.

In step S1103, the communication apparatus 1B receives the connection request from the communication apparatus 1A.

Then, the communication apparatus 1A performs processing for establishing connection with the communication apparatus 1B in S1004, and the communication apparatus 1B performs processing for establishing connection with the communication apparatus 1A in step S1104.

In this case, only the communication apparatuses 1A and 1B have not yet been connected to each other in the group list. Therefore, by performing the processing described above, all of the connections are established among the respective communication apparatuses 1A, 1B, and 1C in the group.

Next, in order to obtain an RSSI value between respective communication apparatuses 1, the communication apparatus 1A issues an RSSI request to the communication apparatus 1B in accordance with the order in the group list in step S1005.

In step S1105, the communication apparatus 1B receives the RSSI request from the communication apparatus 1A.

In step S1106, the communication apparatus 1B transmits, to the communication apparatus 1A, RSSI values (between 1A and 1B and between 1B and 1C) and the number of pieces of connected equipment "2".

In step S1006, the communication apparatus 1A receives the RSSI values (between 1A and 1B and between 1B and 1C) and the number of pieces of connected equipment "2" from the communication apparatus 1B. By doing this, the communication apparatus 1A can obtain an RSSI value between the communication apparatuses 1A and 1B and an RSSI value between the communication apparatuses 1B and 1C.

Furthermore, by transmitting, to the communication apparatus 1A, the number of pieces of connected equipment of the communication apparatus 1B, the communication apparatus 1A can determine whether or not connection has been established between the communication apparatus 1B and the communication apparatus 1C. In this example, the communication apparatus 1B is connected to two pieces of equipment, the communication apparatus 1A and the communication apparatus 1C, and therefore the number of pieces of equipment is "2". Therefore, there are two RSSI values.

Next, in step S1007, the communication apparatus 1A transmits an RSSI request to the communication apparatus 1C that is next in order, in accordance with the group list.

In step S1207, the communication apparatus 1C receives the RSSI request from the communication apparatus 1A.

In step S1208, the communication apparatus 1C transmits, to the communication apparatus 1A, RSSI values (between 1B and 1C and between 1C and 1A) and the number of pieces of connected equipment "2".

In step S1008, the communication apparatus 1A receives the RSSI values (between 1B and 1C and between 1C and 1A) and the number of pieces of connected equipment "2" from the communication apparatus 1C. By doing this, the communication apparatus 1A can obtain an RSSI value between the communication apparatuses 1B and 1C and an RSSI value between the communication apparatuses 1C and 1A.

Furthermore, by transmitting, to the communication apparatus 1A, the number of pieces of connected equipment of the communication apparatus 1C, the communication apparatus 1A can determine whether or not connection has been established between the communication apparatus 1C and the communication apparatus 1B. In this example, the communication apparatus 1C is connected to two pieces of equipment, the communication apparatus 1A and the communication apparatus 1B, and therefore the number of pieces of equipment is "2". Therefore, there are two RSSI values.

By performing the processing so far, the communication apparatus 1A have collected all of the RSSI values between respective pieces of equipment. Accordingly, in step S1009, connection having a smallest RSSI value of the collected RSSI values is determined. For example, it is determined that the RSSI value between the communication apparatuses 1B and 1C is the smallest.

Then, in step S1010, the communication apparatus 1A transmits a disconnection instruction to disconnect between the communication apparatuses 1B and 1C to the communication apparatus 1B having a higher order, in accordance with the order in the group list.

In step S1110, the communication apparatus 1B receives the disconnection instruction to disconnect between the communication apparatuses 1B and 1C from the communication apparatus 1A.

In step S1111, the communication apparatus 1B transmits a disconnection request to the communication apparatus 1C.

In step S1211, the communication apparatus 1C receives the disconnection request from the communication apparatus 1B.

Then, the communication apparatus 1B performs processing for disconnecting from the communication apparatus 1C in S1112 of FIG. 7, and the communication apparatus 1C performs processing for disconnecting from with the communication apparatus 1B in step S1212.

After disconnection has been completed, in step S1113, the communication apparatus 1B reports the completion of disconnection to the communication apparatus 1A, because the communication apparatus 1B has performed disconnection processing in response to a disconnection instruction from the communication apparatus 1A.

In step S1013, the communication apparatus 1A receives the completion of disconnection from the communication apparatus 1B so as to confirm disconnection between the communication apparatuses 1B and 1C.

Note that in a case where the communication apparatus 1A is included in connection between communication apparatuses 1 that is to be disconnected, the communication apparatus 1A itself issues a disconnection request to a connection destination and performs disconnection processing.

Next, processing is performed for forming a piconet for performing stable communication. At this point in time, the communication apparatus 1A is connected to two pieces of equipment, the communication apparatus 1B and the communication apparatus 1C, and therefore, the communication apparatus 1A needs to be master equipment.

Accordingly, in step S1014, the communication apparatus 1A issues, to the communication apparatus 1B, a request that the communication apparatus 1A become a master (a role switch request).

In step S1114, the communication apparatus 1B receives a master request from the communication apparatus 1A.

In step S1115, the communication apparatus 1B makes a request acceptance response to the communication apparatus 1A.

In step S1015, the communication apparatus 1A receives request acceptance from the communication apparatus 1B, so that the communication apparatus 1A becomes a master for the communication apparatus 1B.

Similarly, in step S1016, the communication apparatus 1A issues, to the communication apparatus 1C, a request that the communication apparatus 1A become a master (the role switch request).

In step S1216, the communication apparatus 1C receives a master request from the communication apparatus 1A.

In step S1217, the communication apparatus 1C makes a request acceptance response to the communication apparatus 1A.

In step S1017, the communication apparatus 1A receives request acceptance from the communication apparatus 1C, so that the communication apparatus 1A also becomes a master for the communication apparatus 1C. As a result of the above, a piconet can be formed, and connection form optimization is terminated.

Note that in the example described above, in a case where connection fails to be established between the communication apparatus 1A and the communication apparatus 1B, namely, between slaves, an RSSI value is set to −∞, and the processing is completed in a state where a connection form is left as it is, because connection physically fails to be established.

By performing the connection form optimization operation described above, an optimal connection form in consideration of a radio wave state can be formed in a state where, for example, three pieces of equipment are connected.

Furthermore, the three communication apparatuses 1A, 1B, and 1C have been registered in a group list, and each of the communication apparatuses 1A, 1B, and 1C has obtained the group list. Therefore, an attempt can be made to establish connection between respective pieces of equipment in accordance with the group list.

Pieces of equipment that have not yet been connected to each other can be determined in accordance with the group list, and connection can be established.

Then, a received signal strength indicator (an RSSI value) between respective pieces of equipment can be obtained in a state where connection has been established.

A desirable connection form can be obtained by comparing the obtained RSSI values with each other and forming a new connection form in such a way that connections between pieces of equipment that have a larger RSSI value are used.

To this end, connection between pieces of equipment that has a smaller RSSI value is disconnected, master/slave control is performed on respective pieces of equipment, and a piconet is formed.

Note that even in a case where all of the three pieces of equipment, the communication apparatuses 1A, 1B, and 1C, are in a not-yet-connected state, an optimal connection form can be formed by establishing connection between respective pieces of equipment in accordance with a group list and performing the connection form optimization operation.

Furthermore, even in a case where two of the three pieces of equipment, the communication apparatuses 1A, 1B, and 1C, are connected and the other one is in the not-yet-connected state, an optimal connection form can be formed by establishing connection between respective pieces of equipment in accordance with the group list and performing the connection form optimization operation.

<4. Example of Processing of Communication Apparatus>

A processing algorithm serving as a communication apparatus 1 that enables the connection form optimization operation described above, namely, a processing algorithm principally serving as the connection form determination unit 21d and the connection form change processing unit 21e, is described. An example of processing that is performed on the basis of a program in the controller 21 is described below. By performing the processing described below, respective communication apparatuses 1 can perform processing as the communication apparatuses 1A, 1B, and 1C of FIGS. 6 and 7. Note that it is assumed that grouping is performed on three pieces of equipment, the communication apparatuses 1A, 1B, and 1C serving as the communication apparatuses 1, as described above.

Figure 8:
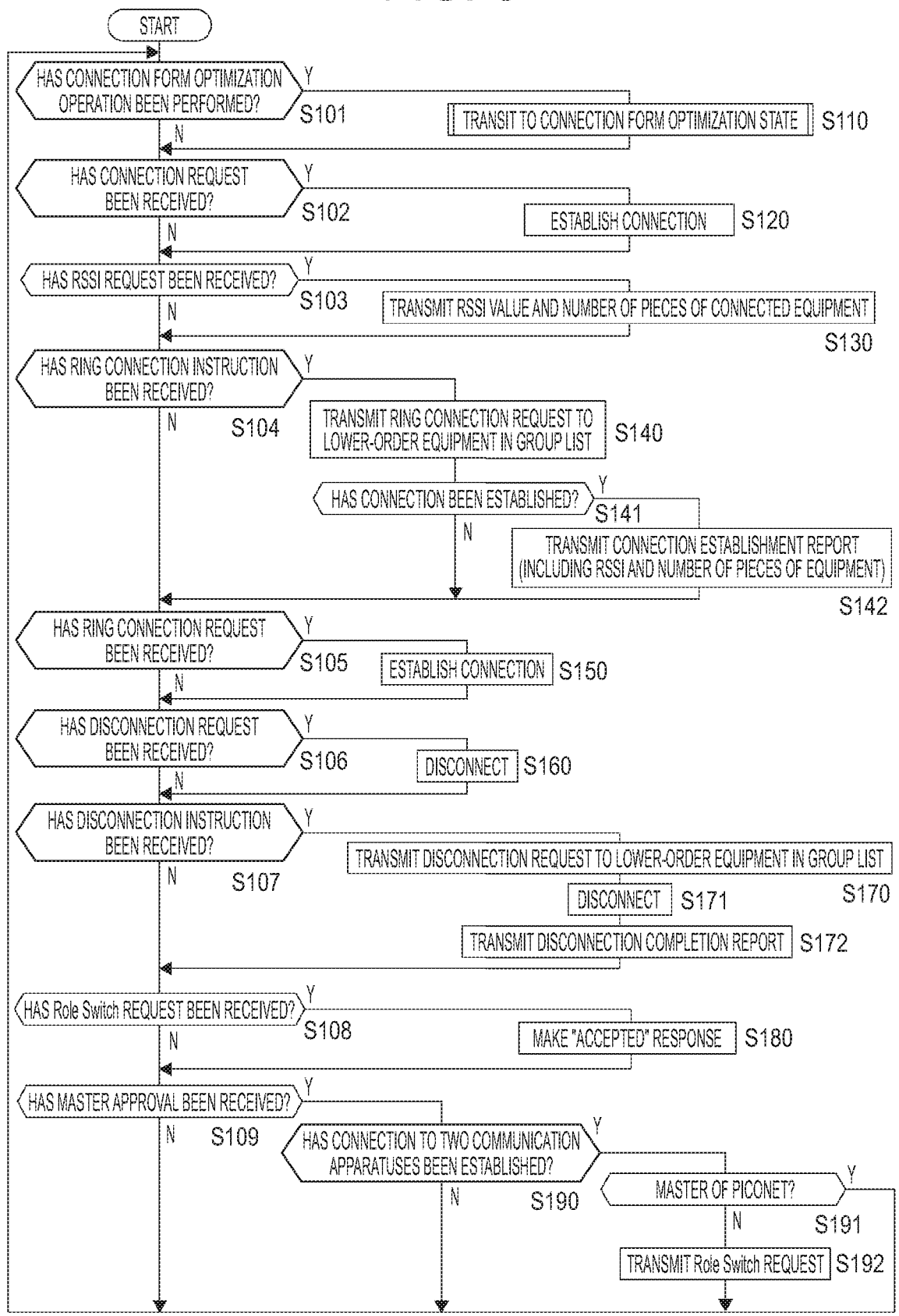
FIG. 8 is a flowchart of processing of a communication apparatus according to the embodiment.

FIG. 8 illustrates loop processing of the controller 21 during a normal operation. The controller 21 repeats a loop of monitoring and detection of steps S101 to S109.

In step S101, the controller 21 monitors whether or not an operation to instruct connection form optimization has been performed by a user. In a case where the operation is detected, the controller 21 performs connection form optimization processing in step S110. Processing for the operation described above of the communication apparatus 1A is performed. This connection form optimization processing will be described later with reference to FIGS. 9 and 10.

In step S102 of FIG. 8, the controller 21 determines whether or not a connection request has been received from another communication apparatus 1. In a case where the connection request has been received from another communication apparatus 1, the processing of the controller 21 moves on to step S120, and the controller 21 establishes connection with a communication apparatus 1 serving as a request source. This corresponds to, for example, the processes of steps S1103 and S1104 performed by the communication apparatus 1B in FIG. 6.

In step S103 of FIG. 8, the controller 21 determines whether or not an RSSI request has been received from another communication apparatus 1. In a case where the RSSI request has been received from another communication apparatus 1, the processing of the controller 21 moves on to step S130, the controller 21 generates information relating to an RSSI value between the local equipment and connected equipment and the number of pieces of connected equipment, and performs processing for transmitting the information to a communication apparatus 1 serving as a request source. This corresponds to, for example, the processes of steps S1105 and S1106 performed by the communication apparatus 1B and the processes of steps S1207 and S1208 performed by the communication apparatus 1C in FIG. 6.

In step S104 of FIG. 8, the controller 21 confirms whether or not a ring connection instruction has been received from another communication apparatus 1. The ring connection instruction is an instruction to cause respective communication apparatuses 1, the communication apparatuses 1A, 1B, and 1C, to be connected to each other.

The example described in FIGS. 6 and 7 indicates a case where the communication apparatus 1A has started the connection form optimization processing, but the communication apparatus 1C starts the connection form optimization processing in some cases. This is a case where a user of the communication apparatus 1C has performed an operation to instruct connection form optimization.

In the case of the example described in FIGS. 6 and 7, the communication apparatus 1A is not connected to the communication apparatus 1B in a piconet before the start of the connection form optimization processing. In this case, if the communication apparatus 1A itself issues a connection request to the communication apparatus 1B, a ring connection state is obtained. However, in a case where the communication apparatus 1C has started the connection form optimization processing, the communication apparatus 1C needs to cause either the communication apparatus 1A or the communication apparatus 1B to establish connection between the communication apparatuses 1A and 1B in order to obtain the ring connection state. In such a case, the communication apparatus 1C transmits the ring connection instruction.

In a case where the controller 21 (for example, a controller 21 of a higher-order apparatus in the group list from among the communication apparatuses 1A and 1B) has received the ring connection instruction, the controller 21 transmits a ring connection request to a lower-order communication apparatus 1 in the group list in step S140. Then, the establishment of connection is confirmed in step S141, and a connection establishment report is transmitted to a communication apparatus serving as a transmission source of the ring connection instruction (for example, the communication apparatus 1C) in step S142. At this time, an RSSI value between the local equipment and a communication apparatus 1 with which connection has been established and the number of pieces of connected equipment are simultaneously transmitted.

In step S105 of FIG. 8, the controller 21 confirms whether or not a ring connection request has been received from another communication apparatus 1. In response to the receipt of the ring connection request, the controller 21 establishes connection with a communication apparatus 1 serving as a request source in step S150.

In step S106, the controller 21 confirms whether or not a disconnection request has been received from another communication apparatus 1. In response to the receipt of the disconnection request, the controller 21 causes disconnection from a communication apparatus 1 serving as a request source in step S160. This corresponds to, for example, the processes of steps S1211 and S1212 performed by the communication apparatus 1C in FIGS. 6 and 7.

In step S107 of FIG. 8, the controller 21 confirms whether or not a disconnection instruction has been received from another communication apparatus 1. The disconnection instruction is an instruction issued by a communication apparatus 1 serving as an instruction source to disconnect from another communication apparatus 1. An example is a disconnection instruction that the communication apparatus 1A transmits to the communication apparatus 1B in step S1010 of FIG. 6. Accordingly, this step S107 is an example of detection performed, for example, by the controller 21 of the communication apparatus 1B.

In response to the receipt of the disconnection instruction, the controller 21 transmits a disconnection request to a lower-order controller apparatus 1 in the group list in step S170. Then, disconnection processing is performed in step S171, and in response to the completion of disconnection, the controller 21 transmits a disconnection completion report to a communication apparatus 1 serving as a disconnection instruction source in step S172.

In step S108 of FIG. 8, the controller 21 confirms whether or not a role switch request, namely, a request for the exchange of master/slave roles, has been received from another communication apparatus 1.

In a case where the role switch request has been received, the controller 21 makes the "accepted" response (request acceptance) in step S180. This corresponds to, for example, the processes of steps S1114 and S1115 performed by the communication apparatus 1B and the processes of steps S1216 and S1217 performed by the communication apparatus 1C in FIG. 7.

In step S109 of FIG. 8, the controller 21 confirms whether or not master approval has been received from another communication apparatus 1. For example, the example of FIGS. 6 and 7 indicates a case where the communication apparatus 1A becomes master equipment after connection form optimization, but the communication apparatus 1A determines that the communication apparatus 1B or the communication apparatus 1C is to be master equipment, in some cases. In these cases, the communication apparatus 1A transmits the master approval to the communication apparatus 1B or 1C. In this case, in step S109, the controller 21 of the controller apparatus 1B or 1C confirms whether or not the master approval has been received.

In a case where the master approval has been received, the controller 21 confirms whether or not connection to two pieces of equipment has been established in step S190. Connection between communication apparatuses 1 that has a smallest RSSI value has already been disconnected (see S1010 of FIG. 6), and therefore a communication apparatus 1 that will become master equipment is connected to two pieces of equipment. Accordingly, in a case where connection to two pieces of equipment has not been established, no particular response is made to the master approval. In a case where connection to two pieces of equipment has been established, the controller 21 determines whether or not the local equipment is master equipment of a piconet in a present situation in step S191. If the local equipment is master equipment in the present situation, no particular response is needed. If the local equipment is not master equipment, the controller 21 transmits the role switch request to another communication apparatus 1 in such a way that the local equipment becomes master equipment in step S192.

The communication apparatuses 1 (1A, 1B, and 1C) perform the processing of FIG. 8 described above.

Figure 9:
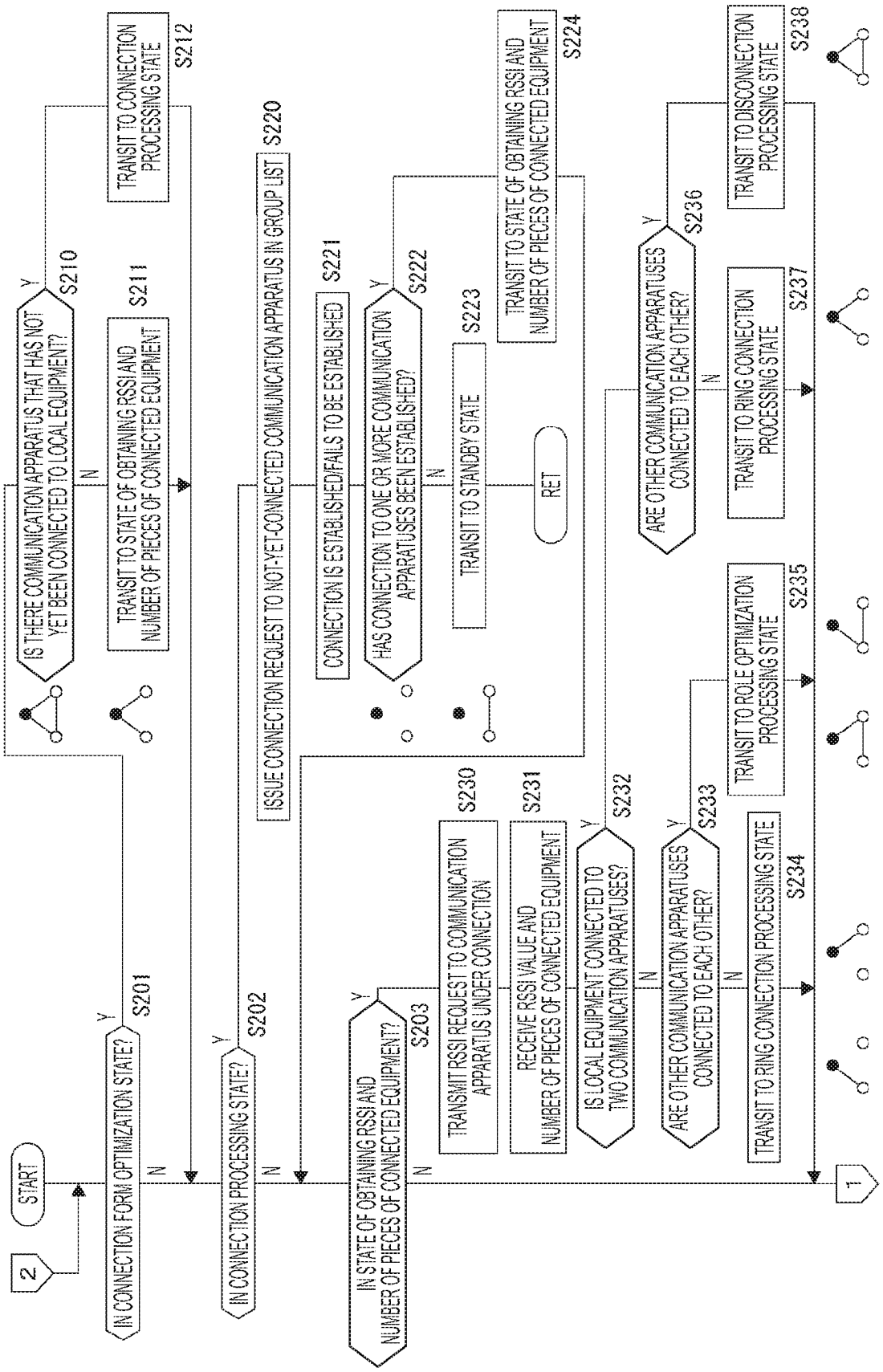
FIG. 9 is a flowchart of connection form optimization processing according to the embodiment.
Figure 10:
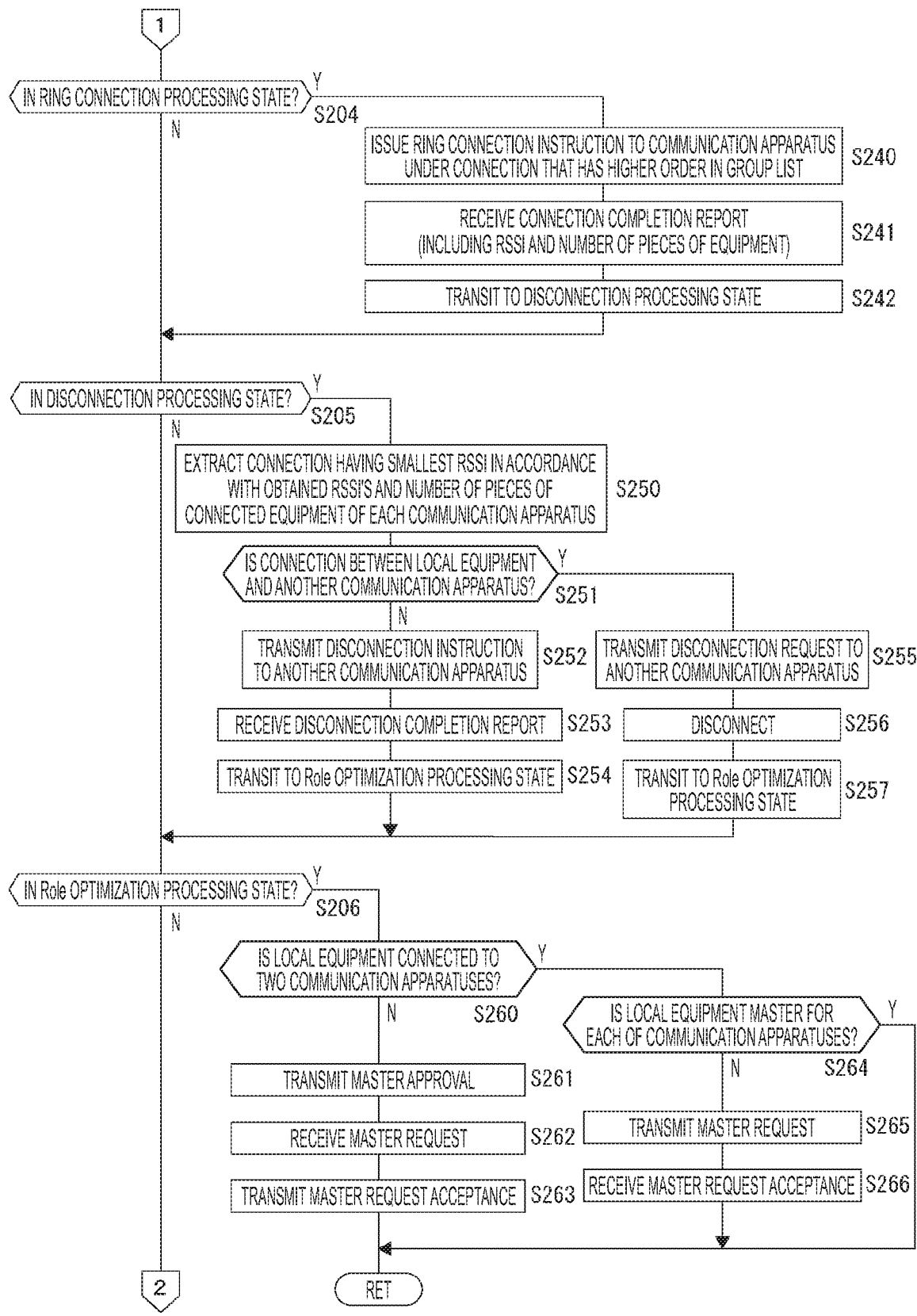
FIG. 10 is a flowchart of the connection form optimization processing according to the embodiment.

Then, a communication apparatus 1 that has started the connection form optimization processing performs processing illustrated in FIGS. 9 and 10 in step S110. Note that FIGS. 9 and 10 are illustrated as continuous processing.

As the connection form optimization processing of FIGS. 9 and 10, the controller 21 repeats the check loop processing of steps S201, S202, S203, S204, S205, and S206.

In step S201 of FIG. 9, the controller 21 confirms whether or not the controller 21 is in a connection form optimization state. If the controller 21 is in the connection form optimization state, the processing moves from step S201 to step S210. The controller 21 that has transited to the connection form optimization state in step S110 in response to an operation detected in step S101 of FIG. 8, as described above, corresponds to this. In step S210, the controller 21 confirms whether or not there is a communication apparatus 1 that has not yet been connected to the local equipment. In a case where there is a communication apparatus 1 that has not yet been connected, the controller 21 transits to a connection processing state in step S212.

If there are no communication apparatuses 1 that have not yet been connected, the controller 21 transits to a state of obtaining an RSSI and the number of pieces of connected equipment in step S211.

In step S202, the controller 21 confirms whether or not the controller 21 is in the connection processing state. The controller 21 that has entered into the connection processing state in step S212 described above moves from step S202 to step S220, and issues a connection request to a not-yet-connected communication apparatus 1 from among communication apparatuses 1 indicated in the group list.

In response to the connection request, in step S221, connection is established in some cases, and connection fails to be established in other cases. For example, in a case where a distance to a communication apparatus 1 serving as a connection request destination has increased, connection fails to be established. Therefore, in response to the connection request, connection to respective other communication apparatuses 1 can be established in some cases, connection to only some of the respective other communication apparatuses 1 can be established in some cases, and no connection to the respective other communication apparatuses 1 can be established in some cases. The processing transits to the next phase in accordance with a success/failure in connection.

In step S222, the processing of the controller 21 diverges in accordance with whether or not connection to one or more communication apparatuses 1 has been established.

In a case where no communication apparatuses 1 are not connected, the controller 21 transits to a standby state in step S223, and terminates the processing of FIGS. 9 and 10 (returns to FIG. 8).

In a case where one or more communication apparatuses 1 are connected, the controller 21 transits to the state of obtaining an RSSI and the number of pieces of connected equipment in step S224.

In step S203, the controller 21 confirms whether or not the controller 21 is in the state of obtaining an RSSI and the number of pieces of connected equipment. In a case where the controller 21 has entered into the state of obtaining an RSSI and the number of pieces of connected equipment in step S211 or S224, the controller 21 moves from step S203 to step S230.

In step S230, the controller 21 transmits an RSSI request to a communication apparatus 1 under connection. In response to this, a communication apparatus 1 serving as a request destination transmits information relating to an RSSI value and the number of pieces of connected equipment in steps S103 and S130 of FIG. 8.

Accordingly, in step S231, the controller 21 receives the information relating to the RSSI value and the number of pieces of connected equipment that has been transmitted from the communication apparatus 1 serving as the request destination in response to the RSSI request.

In step S232, the controller 21 determines whether or not the local equipment is connected to two communication apparatuses 1.

In a case where the local equipment is not connected to two communication apparatuses 1, the controller 21 determines whether or not two other communication apparatuses 1 are connected to each other in step S233.

If two other communication apparatuses 1 are not connected to each other, the controller 21 transits to a ring connection processing state in step S234.

If two other communication apparatuses 1 are connected to each other, the controller 21 transits to a role optimization processing state in step S235.

In a case where the local equipment is connected to two communication apparatuses 1, the controller 21 determines whether or not two other communication apparatuses 1 are connected to each other in step S236.

If two other communication apparatuses 1 are not connected to each other, the controller 21 transits to the ring connection processing state in step S237.

If two other communication apparatuses 1 are connected to each other, the controller 21 transits to a disconnection processing state in step S238.

In step S204 of FIG. 10, the controller 21 confirms whether or not the controller 21 is in the ring connection processing state. In a case where the controller 21 has entered into the ring connection processing state in step S234 or S237 described above, the controller 21 moves from step S204 to step S240.

In step S240, the controller 21 transmits an instruction to establish connection with yet another communication apparatus 1, namely, a ring connection instruction, to a communication apparatus 1 under connection that has a higher order in the group list. This is the issuance of an instruction to establish connection with another communication apparatus 1 to a communication apparatus 1 on a higher-order side in the group list because two other communication apparatuses 1 are not connected to each other from the viewpoint of a communication apparatus 1 that has entered into the ring connection processing state.

In step S241, the controller 21 receives a report about the completion of connection that has been transmitted from a communication apparatus 1 serving as an instruction destination in response to the ring connection instruction. At this time, an RSSI value between the communication apparatus 1 serving as the instruction destination and yet another communication apparatus 1 and the number of pieces of connected equipment are also transmitted from the communication apparatus 1 serving as the instruction destination, and therefore the RSSI value and the number of pieces of connected equipment are obtained. This is because the communication apparatus 1 serving as the instruction destination performs the processes of steps S140, S141, and S142 of FIG. 8.

In step S242, the controller 21 transits to the disconnection processing state.

In step S205, the controller 21 confirms whether or not the controller 21 is in the disconnection processing state. In a case where the controller 21 has entered into the disconnection processing state in step S242 described above, the controller 21 moves from step S205 to step S250.

In step S250, the controller 21 extracts connection having a smallest RSSI value in accordance with RSSI values between respective communication apparatuses 1 and the numbers of pieces of connected equipment of the respective communication apparatuses that have been obtained so far.

In step S251, the processing diverges in accordance with whether or not the extracted connection having the smallest RSSI value is connection between the local equipment and another communication apparatus 1.

In a case where the extracted connection is connection between the local equipment and another communication apparatus 1, the controller 21 moves on to step S255, and transmits a disconnection request to a communication apparatus 1 serving as a connection destination.

Then, the controller 21 performs disconnection processing in step S256. A communication apparatus 1 serving as a transmission destination of the disconnection request performs disconnection processing in step S160 of FIG. 8. Accordingly, communication is disconnected.

In step S257, the controller 21 transits to a role optimization state.

In a case where the extracted connection having the smallest RSSI value is connection between other communication apparatuses 1 in the viewpoint of the local equipment, the controller 21 moves on to step S252, and transmits a disconnection instruction to another communication apparatus 1. At this time, the controller 21 transmits the disconnection instruction to a communication apparatus 1 having a higher order in the group list from among two communication apparatuses 1 to be disconnected.

In response to this, a communication apparatus 1 serving as a transmission destination performs the processes of steps S107, S170, S171, and S172 of FIG. 8. Accordingly, a disconnection completion report is transmitted from the transmission destination.

The controller 21 confirms the completion of disconnection by receiving the disconnection completion report from a communication apparatus 1 serving as an instruction destination in step S253, and transits to the role optimization state in step S254.

In step S206, the controller 21 confirms whether or not the controller 21 is in the role optimization state. In a case where the controller 21 has entered into the role optimization state in step S254 or S257 described above, the controller 21 moves from step S206 to step S260.

In step S260, the controller 21 confirms whether or not the local equipment is connected to two communication apparatuses 1. A connection state changes depending on which connection between communication apparatuses 1 has been disconnected in the disconnection processing described above, and the local equipment is either connected to two communication apparatuses 1 or is connected to only one communication apparatus 1.

A case where the local equipment is connected to two communication apparatuses 1 is a case where the local equipment will become master equipment. Accordingly, the controller 21 moves on to step S264, and confirms whether or not the local equipment is master equipment for each of communication apparatuses 1 in a present situation. If the local equipment is master equipment for respective other communication apparatuses 1, an optimal piconet has already been formed, and therefore the connection form optimization processing is terminated with no change, and the processing returns to the loop processing of FIG. 8.

If the local equipment is not master equipment for the respective other communication apparatuses 1, the controller 21 moves from step S264 to step S265, and transmits a master request (a roll switch request) to another communication apparatus 1 in such a way that the local equipment will become a master. In response to this, a communication apparatus 1 serving as a request destination performs the processes of steps S108 and S180 of FIG. 8, and transmits a request acceptance response.

In step S266, the controller 21 receives an acceptance response to the master (role switch) request, and the local equipment becomes master equipment. As a result of the above, the local equipment becomes master equipment, and an optimal piconet is formed. Therefore, the connection form optimization processing is terminated, and the processing returns to the loop processing of FIG. 8.

In a case where it is determined in step S260 that the local equipment is not connected to two communication apparatuses 1, the controller 21 moves on to step S261, and transmits master approval to another communication apparatus 1 that is connected to the local equipment. The communication apparatus 1 to which the master approval has been transmitted performs the processes of steps S109 to S192 of FIG. 8.

Specifically, from among communication apparatuses 1 to which the master approval has been transmitted, a communication apparatus 1 that is connected to only one piece of equipment transmits does not perform any particular communication because a determination result in step S190 is NO. In contrast, a communication apparatus 1 that is connected to two pieces of equipment moves on to steps S190 and S191, and transmits a master request in step S192 if the communication apparatus 1 is not master equipment.

Therefore, the controller 21 receives the master request in step S262. In step S263, the controller 21 transmits an acceptance response to a communication apparatus 1 serving as a transmission source in response to the master request. As a result of this, the communication apparatus 1 serving as the transmission source of the master request becomes master equipment, and an optimal piconet is formed. Therefore, the connection form optimization processing is terminated, and the processing returns to the loop processing of FIG. 8.

Respective communication apparatuses 1 are enabled to perform the processing of FIGS. 8, 9, and 10 described above, and therefore the respective communication apparatuses 1 perform a behavior of any of the communication apparatuses 1A, 1B, and 1C of FIGS. 6 and 7, and automatic connection form optimization is performed.

<5. Summary and Modified Examples>

A communication apparatus 1 according to the embodiment described above includes: a connection form determination unit 21d that refers to a group list indicating three or more communication apparatuses 1 that have been set as a group for performing wireless communication, the three or more communication apparatuses 1 including local equipment, obtains a value (an RSSI value) indicating a degree of stability of communication between respective communication apparatuses 1 indicated in the group list, and determines a new connection form by using the value indicating the degree of stability of communication between the respective communication apparatuses 1; and a connection form change processing unit 21e that performs processing for causing the new connection form determined by the connection form determination unit 21d to be formed among respective communication apparatuses 1 included in the group.

For example, in a state where three communication apparatuses are grouped and in communication, in a case where one of the three communication apparatuses is set as master equipment and two of the three communication apparatuses are set as pieces of slave equipment to form a piconet, there is no guarantee that this connection form will always be maintained optimally. Accordingly, the connection form determination unit 21d determines, for example, whether or not a current connection form is optimal in a present situation. If the current connection form is not optimal, the connection form determination unit 21d determines a new more suitable connection form. In other words, a determination is made in such a way that a piconet is re-formed while connection between communication apparatuses 1 having a smallest RSSI value is avoided (S240 to S242 and S250). The connection form change processing unit 21e performs processing for changing the current connection form to a connection form that has been determined to be more suitable. In other words, connection having a smallest RSSI value is disconnected, and role switching is performed as needed (S251 to S257, S206, and S260 to S266).

When connection form optimization is started due to the functions of the connection form determination unit 21d and the connection form change processing unit 21e, it is determined whether or not a current connection form is suitable, and if the current connection form is not optimal, the current connection form is changed to a new more suitable connection form. That is, a change into a more suitable connection form is automatically performed adaptively to a present situation. Accordingly, a satisfactory communication state is easily realized.

In particular, by using a group list, as in the embodiment, smooth connection form optimization is realized.

Even in a case where the group list is not used, for example, an RSSI between pieces of slave equipment that have not yet been connected can be obtained in response to an inquiry. In other words, an RSSI between slaves can be obtained by making an inquiry so as to obtain a list of devices in the vicinity and determining communication apparatuses in a group in the list, and a communication apparatus 1A that has started connection form optimization is caused to obtain the RSSI. However, this processing normally requires a time period of several tens of seconds, and communication is not available during obtainment, and therefore this processing is not suitable for practical use in many cases.

In the case of the present embodiment, addresses of respective communication apparatuses in a group are known due to group list information. Therefore, an inquiry for searching for Bluetooth equipment in the vicinity is not needed, and an RSSI between pieces of equipment that have not yet been connected can be obtained in a very short time. Therefore, connection form optimization can be completed without imposing any temporal stress on a user. Stated another way, a user does not need special consciousness.

Then, due to the connection form optimization described above, calls can be restored to a satisfactory state (for example, a state with less noise), for example, in a case where call quality has deteriorated. Stated another way, calls in a group can be maintained in a satisfactory state.

Users do not need to perform pairing or a connection operation according to a positional relationship among group members or the order of the group members.

Furthermore, even in a case where the respective users desire to change the positional relationship among the group members or the order of the group members, a complicated operation such as pairing or disconnection/reconnection processing is not required.

Furthermore, due to the connection form optimization function described above, the respective users can freely move without being conscious of a connection form, and a stress imposed by calls can be relieved.

Furthermore, even in a case where a situation where radio waves are unavailable has occurred and, for example, one of three pieces of equipment fails to establish connection, or other cases, a connection form optimization function according to the embodiment enables connection between the two other pieces of equipment. This is because, for example, if master equipment moves physically far away, the three pieces of equipment enter into a not-yet-connected state, but a connection state can easily change in such a way that the two other pieces of equipment are connected to each other.

Furthermore, for example, in a situation where one of three pieces of equipment is in the not-yet-connected state and the two other pieces are connected to each other, in a case where the not-yet-connected one piece of equipment has moved closer, connection form optimization can be performed in such a way that connection is established. For example, a communication apparatus 1 of a user who has moved closer starts connection form optimization processing, so that a state can be generated where calls are available among the three pieces of equipment. Alternatively, either of two communication apparatuses 1 connected to each other starts the connection form optimization processing, so that connection among three pieces of equipment for which a connection form has been optimized can be established. Calls are enabled while the connection form is flexibly changed by performing the processing above, namely, in accordance with a positional state of the group members.

Thus, a communication apparatus 1 that is excellent in usability for a user to perform group calls can be provided.

In the embodiment, an example has been described where processing for determining a connection form is started on the basis of a user's operation (see S1001 of FIG. 6 and S101 of FIG. 8). In other words, in response to the user's operation, the connection form determination unit 21d determines a desirable connection form, and the connection form change processing unit 21e performs processing for changing a connection form.

By optimizing the connection form in response to the user's operation, a communication apparatus 1 does not need to constantly check whether or not connection form optimization is needed. This results in a reduction in a processing load on the communication apparatus 1.

Furthermore, an effect of reducing power consumption is exhibited by not constantly performing processing for determining a connection state such as the obtainment of an RSSI value, for example.

In use, it is sufficient if a user that is aware of a deterioration in the quality of call sound, or the like performs an operation to issue an instruction to start connection form optimization, and a burden of performing a troublesome operation is not imposed on the user. It is sufficient if the user performs the operation described above when there is much noise or it is difficult to hear sound, and normally, the user does not need to pay attention to a positional relationship or the like.

Note that in the embodiment, connection form optimization processing is started on the basis of a user's operation, but connection form optimization can be automatically started.

For example, it is detected that a communication environment between communication apparatuses 1 has significantly deteriorated, and in such a case, the connection form optimization processing is automatically started. Conceivable examples of a deterioration in a communication environment include the monitoring of a packet error rate, or the like. For example, it is conceivable that, in a case where the communication apparatus 1C has detected that an error rate of a communication packet from another communication apparatus 1B detected by the local equipment exceeds a preset threshold, the communication apparatus 1C determines that connection form optimization is needed and the communication apparatus 1C starts the connection form optimization processing.

In the embodiment, a value of a received signal strength indicator (RSSI) between respective communication apparatuses 1 indicated in a group list is obtained as a value indicating a degree of stability of communication between the respective communication apparatuses 1.

In other words, an RSSI value between respective communication apparatuses 1 is confirmed for round-robin combinations of three or more respective communication apparatuses 1.

By obtaining the RSSI value between respective communication apparatuses 1, a communication state between respective communication apparatuses 1 in a group can be determined. Then, a desirable connection form for performing stable communication can be determined on the basis of the respective RSSI values.

Note that in a case where the RSSI value is obtained as processing for determining a connection form in response to a user's operation, as described above, the RSSI value is monitored only when the connection form is optimized, resulting in a reduction in power consumption.

Furthermore, the value indicating the degree of stability of communication between respective communication apparatuses 1 is not limited to the RSSI value. For example, other information, such as a packet error rate or a bit error rate that is detected between respective communication apparatuses 1, may be employed.

In the embodiment, a case has been described where information relating to a received signal strength indicator (an RSSI value) is requested of a communication apparatus 1 selected according to the group list and information relating to a received signal strength indicator (an RSSI value) between a communication apparatus 1 serving as a request destination and another communication apparatus 1 is received from the communication apparatus 1 serving as the request destination (S230 and S231).

In other words, an RSSI value between another communication apparatus 1 in the group and each of the communication apparatuses 1 is requested from the other communication apparatus 1.

By doing this, an RSSI value between a communication apparatus 1 serving as a request destination and another communication apparatus 1 and an RSSI value between the communication apparatus 1 serving as the request destination and the local equipment can be obtained. By performing this processing, the RSSI value can be confirmed for all of the combinations of respective communication apparatuses 1 in the group.

In particular, by selecting a communication apparatus 1 serving as a request destination in accordance with the group list, a communication state between respective communication apparatuses 1 in the group can be efficiently grasped.

In the embodiment, a case has been described where in a case where a not-yet-connected communication apparatus 1 has been selected in accordance with the group list, processing for establishing connection of communication with the selected communication apparatus 1 (S220 to S224). In other words, connection is established when the RSSI value is requested from another communication apparatus 1 that has not yet been connected in the group.

By doing this, the RSSI value can also be obtained from a not-yet-connected communication apparatus 1 serving as a request destination. By using the group list, processing can be performed while a not-yet-connected communication apparatus 1 is also grasped as equipment in the group.

In the embodiment, communication apparatuses 1 having a lowest degree of stability of communication therebetween are determined from among communication apparatuses 1 that have been set as a group, and processing is performed for disconnecting between the communication apparatuses 1 having the lowest degree of stability of communication therebetween (S250 to S257).

In other words, in order to realize a desirable connection form, from among combinations of respective communication apparatuses 1 in the group, communication apparatuses 1 having the lowest degree of stability of communication are disconnected. By doing this, a desirable connection form can be realized in which connections between communication apparatuses 1 having a relatively high degree of stability of communication are maintained.

In the embodiment, processing for setting master equipment and slave equipment is performed in such a way that communication is available among respective communication apparatuses 1 that have been set as a group in a state where communication has been disconnected between communication apparatuses 1 having the lowest degree of stability of communication therebetween (S260 to S266).

In other words, a relationship between master equipment and slave equipment is optimized in such a way that respective pieces of equipment can perform communication in a state where certain communication apparatuses 1 having a low quality of communication have been disconnected.

This causes a desirable connection form to be reconstructed. In other words, as a result of optimizing the connection form, a piconet is formed, and stable communication can be performed.

The communication apparatus 1 according to the embodiment includes a sound input unit (the microphone 13 and the input amplifier 26), a sound output unit (the speaker 12 and the output amplifier 27), and a codec unit (the audio codec 24) that encodes and decodes a sound signal, and communicates call sound.

As a communication apparatus for conversation communication or the like, a system that optimizes the connection form in accordance with situations can be realized. In group calls, respective users are provided with a call environment that is excellent in usability and that does not impose, on the respective users, a stress such as a positional relationship among the respective users.

Note that a technology of the present disclosure is not limited to an example of the embodiment.

Although the SoC 10 illustrated in FIGS. 1A and 1B is configured, for example, by a Bluetooth wireless unit, an MCU, a DSP, a ROM, an I/O, a flash ROM, a RAM, an audio codec, an audio amplifier, and the like, respective units can be used in combination with each other as parts.

Furthermore, in the embodiment, an example has been described where three communication apparatuses 1 are used, but the present technology is applicable to three or more communication apparatuses. In the case of a communication apparatus 1 using Bluetooth communication, the present technology can also be embodied by using three to eight communication apparatuses 1.

Furthermore, the operation example illustrated in FIGS. 6 and 7 has been described under the assumption of a case where the three communication apparatuses 1A, 1B, and 1C have been connected. However, the present technology can be performed even in a case where the three communication apparatuses have not yet been connected or two of the three communication apparatuses have been connected.

Moreover, in a case where one of the three communication apparatuses has entered into a not-yet-connected state because of a state where radio waves do not physically reach the one, the present technology enables connection to be established between the two other communication apparatuses. Next, in a case where the one not-yet-connected communication apparatus has entered a range of distance that radio waves reach, either the one not-yet-connected communication apparatus or the two communication apparatuses under connection can perform connection according to the present technology, and three-apparatus connection in which a connection form has been optimized can be established.

Specific examples of a product to which the present technology is applicable are assumed to be Bluetooth headsets, Bluetooth headphones, Bluetooth speakers, intercom equipment for motorcycles or bicycles, and the like.

A program according to the embodiment is a program for causing an information processor an arithmetic processor (the controller 21) that controls a communication apparatus 1 to execute: a connection form determination step of referring to a group list indicating three or more communication apparatuses 1 that have been set as a group for performing wireless communication, the three or more communication apparatuses 1 including local equipment, obtaining a value indicating a degree of stability of communication between respective communication apparatuses 1 indicated in the group list, and determining a new connection form by using the value indicating the degree of stability of communication between the respective communication apparatuses 1; and a connection form change processing step of performing processing for causing the new connection form determined in the connection form determination step to be formed among respective communication apparatuses 1 included in the group.

In other words, this is a program for causing the arithmetic processor (a computer apparatus) to perform the processing of FIGS. 8, 9, and 10.

The program described above enables the communication apparatus 1 according to the present embodiment to be easily realized.

Then, the program described above can be stored, in advance, in a recording medium incorporated into equipment such as a computer apparatus, a ROM in a microcomputer including a CPU, or the like. Alternatively, the program described above can be temporarily or permanently stored in a removable recording medium such as a semiconductor memory, a memory card, an optical disk, a magneto-optical disk, or a magnetic disk. Furthermore, such a removable recording medium can be provided as what is called package software.

Furthermore, the program described above can be installed in a personal computer or the like from the removable recording medium, or can be downloaded from a download site via a network such as a LAN or the Internet.

Note that the effects described herein are only illustrative and are not restrictive, and other effects may be exhibited.

Note that the present technology can also employ the configuration described below.

(1) A communication apparatus including:
a connection form determination unit that refers to group list information indicating three or more communication apparatuses that have been set as a group for performing wireless communication, the three or more communication apparatuses including local equipment, obtains a value indicating a degree of stability of communication between respective communication apparatuses indicated in the group list information, and determines a new connection form by using the value indicating the degree of stability of communication between the respective communication apparatuses; and
a connection form change processing unit that performs processing for causing the new connection form determined by the connection form determination unit to be formed among respective communication apparatuses included in the group.

(2) The communication apparatus described in (1) described above,
in which the connection form determination unit starts processing for determining a connection form on the basis of a user's operation.

(3) The communication apparatus described in (1) or (2) described above,
in which the connection form determination unit obtains a value of a received signal strength indicator between respective communication apparatuses indicated in the group list information, as the value indicating the degree of stability of communication between the respective communication apparatuses.

(4) The communication apparatus described in (3) described above,
in which the connection form determination unit requests information relating to the received signal strength indicator from a communication apparatus selected according to the group list information, and receives, from a communication apparatus serving as a request destination, the information relating to the received signal strength indicator between the communication apparatus serving as the request destination and another communication apparatus.

(5) The communication apparatus described in (4) described above,
in which in a case where a communication apparatus that has not yet been connected is selected in accordance with the group list information, the connection form determination unit performs processing for connection of communication with the selected communication apparatus.

(6) The communication apparatus described in any of (1) to (5) described above,
in which the connection form determination unit determines communication apparatuses having a lowest degree of stability of communication therebetween, from among communication apparatuses that have been set as the group, and
the connection form change processing unit performs processing for disconnecting communication between the communication apparatuses having the lowest degree of stability of communication.

(7) The communication apparatus described in (6) described above,
in which the connection form change processing unit performs processing for setting master equipment and slave equipment in such a way that communication is available among the respective communication apparatuses that have been set as the group in a state where the communication between the communication apparatuses having the lowest degree of stability of communication therebetween has been disconnected.

(8) The communication apparatus described in any of (1) to (7) described above, further including:
a sound input unit; a sound output unit; and a codec unit that encodes and decodes a sound signal,
in which call sound is communicated.

(9) A communication method of a communication apparatus, the communication method including:
a connection form determination procedure for referring to group list information indicating three or more communication apparatuses that have been set as a group for performing wireless communication, the three or more communication apparatuses including local equipment, obtaining a value indicating a degree of stability of communication between respective communication apparatuses indicated in the group list information, and determining a new connection form by using the value indicating the degree of stability of communication between the respective communication apparatuses; and
a connection form change processing procedure for performing processing for causing the new connection form determined in the connection form determination procedure to be formed among respective communication apparatuses included in the group.

(10) A program for causing an arithmetic processor that controls a communication apparatus to execute:
a connection form determination step of referring to group list information indicating three or more communication apparatuses that have been set as a group for performing wireless communication, the three or more communication apparatuses including local equipment, obtaining a value indicating a degree of stability of communication between respective communication apparatuses indicated in the group list information, and determining a new connection form by using the value indicating the degree of stability of communication between the respective communication apparatuses; and a connection form change processing step of performing processing for causing the new connection form determined in the connection form determination step to be formed among respective communication apparatuses included in the group.

REFERENCE SIGNS LIST 1, 1A, 1B, 1C Communication apparatus
10 Bluetooth SoC
11 Antenna
12 Speaker
13 Microphone
21 Controller
21a Communication controller
21b List information processing unit
21c Pairing processing unit
21d Connection form determination unit
21e Connection form change processing unit
22 Memory
23 Wireless communication unit
24 Audio codec
25 Audio interface
26 Input amplifier
27 Output amplifier

The invention claimed is:

1. A communication apparatus, comprising:
a processor configured to:
obtain group list information indicating at least three communication apparatuses that are set as a group for wireless communication, wherein the at least three communication apparatuses include local equipment;
obtain a value that indicates a degree of stability of communication between respective communication apparatuses of the at least three communication apparatuses indicated in the group list information;
determine a new connection form based on the value that indicates the degree of stability of communication between the respective communication apparatuses of the at least three communication apparatuses;
control, based on the new connection form, disconnection of at least one communication between the respective communication apparatuses of the at least three communication apparatuses that has a lowest degree of stability of communication among the at least three communication apparatuses; and
execute a process to generate the new connection form among the respective communication apparatuses of the group based on the disconnection.

2. The communication apparatus according to claim 1, wherein the processor is further configured to determine the new connection form on based on a user operation.

3. The communication apparatus according to claim 1, wherein the processor is further configured to obtain the value corresponding to a received signal that indicates a strength of the received signal between the respective communication apparatuses indicated in the group list information.

4. The communication apparatus according to claim 3, wherein the processor is further configured to:
request information related to the strength of the received signal from a communication apparatus of the at least three communication apparatuses which is selected according to the group list information; and
receive, from the communication apparatus that serves as a request destination, the information related to the strength of the received signal between the communication apparatus that serves as the request destination and another communication apparatus of the at least three communication apparatuses.

5. The communication apparatus according to claim 4, wherein the processor is further configured to:
select the communication apparatus that is not connected based on the group list information; and
establish a connection with the selected communication apparatus.

6. The communication apparatus according to claim 1, wherein the processor is further configured to
determine the respective communication apparatuses that have the lowest degree of stability of communication among the at least three communication apparatuses of the group.

7. The communication apparatus according to claim 6, wherein the processor is further configured to
set a master equipment and a slave equipment in such a way that communication is available among the respective communication apparatuses of the group in a state where the communication between the respective communication apparatuses having the lowest degree of stability of communication has been disconnected.

8. The communication apparatus according to claim 1, further comprising:
a sound input unit;
a sound output unit; and
a codec unit that encodes and decodes a sound signal, wherein the sound signal is communicated from the sound input unit to the sound output unit.

9. A communication method comprising:
determining group list information indicating at least three communication apparatuses that are set as a group for wireless communication, wherein the at least three communication apparatuses include local equipment;
obtaining a value that indicates a degree of stability of communication between respective communication apparatuses of the at least three communication apparatuses indicated in the group list information;
determining a new connection form based on the value that indicates the degree of stability of communication between the respective communication apparatuses of the at least three communication apparatuses;
controlling, based on the new connection form, disconnection of at least one communication between the respective communication apparatuses of the at least three communication apparatuses that has a lowest degree of stability of communication among the at least three communication apparatuses; and
executing a process to generate the new connection form among the respective communication apparatuses of the group based on the disconnection.

10. A non-transitory computer-readable medium having stored thereon, computer-executable instructions which, when executed by a controller cause a controller to execute operations, the operations comprising:

determining group list information that indicates at least three communication apparatuses that are set as a group for wireless communication, wherein the at least three communication apparatuses includes local equipment;

obtaining a value that indicates a degree of stability of communication between respective communication apparatuses of the at least three communication apparatuses in the group list information;

determining a new connection form based on the value that indicates the degree of stability of communication between the respective communication apparatuses of the at least three communication apparatuses;

controlling, based on the new connection form, disconnection of at least one communication between the respective communication apparatuses of the at least three communication apparatuses that has a lowest degree of stability of communication among the at least three communication apparatuses; and executing a process to generate the new connection form among the respective communication apparatuses of the group based on the disconnection.

* * * * *